(12) United States Patent
Devan et al.

(10) Patent No.: US 12,404,846 B2
(45) Date of Patent: Sep. 2, 2025

(54) ELECTRONIC PRESSURE COMPENSATED HYDRAULIC MOTOR PUMP WITH VARIABLE OUTPUT POWER

(71) Applicant: Eaton Intelligent Power Limited, Dublin (IE)

(72) Inventors: Stephen Marshall Devan, Madison, MS (US); Kelly Dale Valtr, Aurora, TX (US); Joshua Boone Pepper, Madison, MS (US)

(73) Assignee: Eaton Intelligent Power Limited, Dublin (IE)

( * ) Notice: Subject to any disclaimer, the term of this patent is extended or adjusted under 35 U.S.C. 154(b) by 135 days.

(21) Appl. No.: 17/933,978

(22) Filed: Sep. 21, 2022

(65) Prior Publication Data
US 2023/0102332 A1    Mar. 30, 2023

Related U.S. Application Data

(60) Provisional application No. 63/246,366, filed on Sep. 21, 2021.

(51) Int. Cl.
*F04B 17/03* (2006.01)
*F04B 49/06* (2006.01)
(Continued)

(52) U.S. Cl.
CPC ........... *F04B 17/03* (2013.01); *F04B 49/065* (2013.01); *F04B 49/20* (2013.01); *H02P 4/00* (2013.01); *H02P 6/06* (2013.01); *F04B 1/20* (2013.01); *F04B 2201/1201* (2013.01); *F04B 2203/0201* (2013.01); *F04B 2203/0202* (2013.01); *F04B 2203/0208* (2013.01);
(Continued)

(58) Field of Classification Search
CPC .......... F04B 1/20; F04B 17/03; F04B 49/065; F04B 49/20; F04B 2201/1201; F04B 2203/0201; F04B 2203/0202; F04B 2203/0208; F04B 2203/0209; F04B 2205/05; F04B 2205/06; F04B 2205/09; H02P 4/00; H02P 6/06
See application file for complete search history.

(56) References Cited

U.S. PATENT DOCUMENTS

| 4,285,639 A | 8/1981 | Woodring et al. |
| 8,667,783 B2 | 3/2014 | Naydenov et al. |

(Continued)

FOREIGN PATENT DOCUMENTS

WO    2022/186753 A1    9/2022

OTHER PUBLICATIONS

Search Report issued in copending application GB2213700.4 mailed on Mar. 13, 2023.

*Primary Examiner* — Charles G Freay
(74) *Attorney, Agent, or Firm* — Merchant & Gould P.C.

(57) ABSTRACT

An electronic pressure compensated hydraulic motor pump is controlled to provide variable output power based on a variable input signal. The variable output power feature allows the motor pump to be used with a power management system to better match the output power of the motor pump with the available power of an electrical system. The ability to provide variable output power provides beneficial power management for electrical systems that switch between different power modes, e.g., between a generator power mode and a battery power mode.

14 Claims, 6 Drawing Sheets

(51) Int. Cl.
    *F04B 49/20*      (2006.01)
    *H02P 4/00*       (2006.01)
    *H02P 6/06*       (2006.01)
    *F04B 1/20*       (2020.01)

(52) U.S. Cl.
    CPC ... *F04B 2203/0209* (2013.01); *F04B 2205/05* (2013.01); *F04B 2205/06* (2013.01); *F04B 2205/09* (2013.01); *Y02T 50/80* (2013.01)

(56) References Cited

U.S. PATENT DOCUMENTS

| | | |
|---|---|---|
| 10,100,827 B2 | 10/2018 | Devan et al. |
| 10,530,286 B2 * | 1/2020 | Xiang ............ H02P 21/06 |
| 2006/0045749 A1 | 3/2006 | Beckman |
| 2010/0021313 A1 * | 1/2010 | Devan ............ F04B 17/03 |
| | | 417/44.1 |
| 2016/0265520 A1 * | 9/2016 | Skinner, Jr. ........ F04B 49/065 |
| 2021/0095661 A1 * | 4/2021 | Shirai ............ F04B 49/20 |

* cited by examiner

ELECTRONIC PRESSURE COMPENSATED HYDRAULIC MOTOR PUMP WITH VARIABLE OUTPUT POWER

CROSS-REFERENCE TO RELATED APPLICATIONS

This application claims the benefit of U.S. Provisional Application No. 63/246,366, filed Sep. 21, 2021, and titled "Electronic Pressure Compensated Hydraulic Motor Pump with Variable Output Power," the disclosure of which is hereby incorporated by reference.

BACKGROUND

The commercial aircraft industry is currently evaluating means to significantly reduce or eliminate $CO_2$ emissions with the next generation aircraft and support equipment. Government initiatives such as EU's Clean Sky 2025-2050 is establishing targets and timing for aircraft OEMs to reduce $CO_2$ emissions. More electric aircraft utilizing battery fuel cells is one possible solution toward achieving reduced emissions goals. Elimination of fossil fuel ground support equipment is an additional $CO_2$ focus for reduction during gate transitions. Today ground carts convert fossil fuel to power the aircraft's electric motor driven hydraulic pumps used to open/close cargo doors, verify function of flight control actuators, and perform maintenance operations during gate transitions. The aircraft's hydraulic pumps are fixed pressure, sized to power flight control actuators subjected to high loads during flight. During gate operation the hydraulic pump consumes the same power as during flight which is not required during ground operations.

SUMMARY

An electronic pressure compensated hydraulic motor pump, according to the present disclosure, provides a variable output power electric motor driven hydraulic pump that reduces consumed power during gate transitions of an aircraft while providing the full power needed by the aircraft during flight. The electronic pressure compensated hydraulic motor pump enables an aircraft to manage the battery fuel cell life by using only the power needed to perform an intended function without demanding excessive un-needed power. This capability assists in eliminating a ground service cart and supports optimizing the battery size reducing mean take-off weight thus reducing fuel consumption during flight. More generally, the electronic pressure compensated hydraulic motor pump is controlled to provide variable output power based on a variable input signal. The variable output power feature allows the motor pump to be used with a power management system to better match the output power of the motor pump with the available power of an electrical system. The ability to provide variable output power provides beneficial power management for electrical systems that switch between different power modes, e.g., between a generator power mode and a battery power mode.

An aspect of the present disclosure relates to a fluid device system. The fluid device system includes a fluid pump, an electric motor and a controller. The fluid pump has a fixed displacement and includes a fluid inlet and a fluid outlet. The electric motor has a shaft coupled to the fluid pump and the shaft rotates in response to a power command signal received at the electric motor. The controller receives a first input value and produces an output to communicate the power command signal to the electric motor. The controller adjusts the power command signal to operate the electrical motor in a normal operating mode and a input control operating mode. In the normal operating mode, the controller refers to a first lookup table using the first input value and outputs a first power command signal to the electrical motor based on the referral to the first lookup table. In the input control mode, the controller determines a second power control signal such that the fluid pump operated at a reduced capacity in comparison to the normal operating mode. In certain embodiments, a scalar value is used by the controller to determine the second power control signal.

Another aspect of the present disclosure relates to a method of controlling a fluid device system having a fixed displacement fluid pump, an electric motor having a rotational shaft coupled to the fluid pump, and a controller including an output to communicate a command signal to the electric motor. The method includes: (a) receiving at the controller an input directing operation in either a normal operating mode or an input control operating mode; (b) in response to an input directing operation in a normal mode, receiving a first input value at the controller, using the first input value to reference a first output value in a lookup table of the controller, and outputting from the controller a first power command signal that corresponds to the first output value to the electrical motor; and (c) in response to an input directing operation in an input control operating mode, receiving a scalar value at the controller, scaling at the controller at least a portion of the content of the lookup table with the scalar value, receiving a second input value at the controller, using the second input value to reference a second output value in the scaled lookup table, and outputting from the controller a second power command signal that corresponds to the second output value to the electrical motor.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

An electronic pressure compensated hydraulic motor pump, according to the present disclosure, provides a variable output power electric motor driven hydraulic pump that reduces consumed power during gate transitions of an aircraft while providing the full power needed by the aircraft during flight. The electronic pressure compensated hydraulic motor pump enables an aircraft to manage the battery fuel cell life by using only the power needed to perform an intended function without demanding excessive un-needed power. This capability assists in eliminating a ground service cart and supports optimizing the battery size reducing mean take-off weight thus reducing fuel consumption during flight. More generally, the electronic pressure compensated hydraulic motor pump is controlled to provide variable output power based on a variable input signal. The variable output power feature allows the motor pump to be used with a power management system to better match the output power of the motor pump with the available power of an electrical system. The ability to provide variable output power provides beneficial power management for electrical systems that switch between different power modes, e.g., between a generator power mode and a battery power mode.

Figure 1:
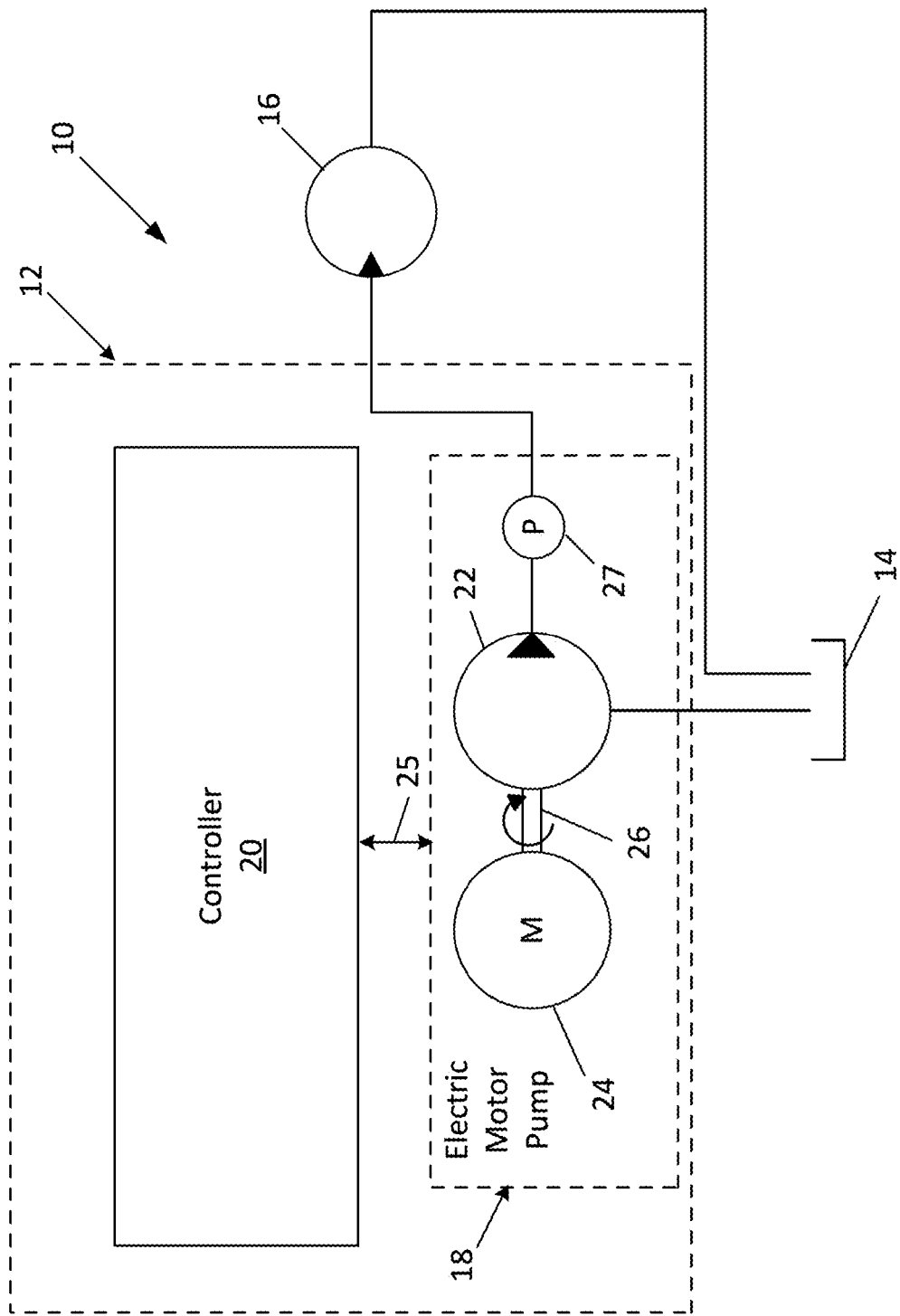
FIG. 1 is a schematic representation of a simplified hydraulic system that includes an electronic pressure compensated hydraulic motor pump according to the present disclosure.

Referring now to FIG. 1, a schematic representation of a simplified exemplary hydraulic system, generally designated 10, is shown. The hydraulic system 10 includes a fluid device system, generally designated 12, in fluid communication with a fluid reservoir 14 and an actuator 16 (e.g., motor, cylinder, etc.). The fluid device system 12 includes a rotary fluid device, generally designated 18 and a controller, generally designated 20.

The rotary fluid device 18 includes a fluid pump 22, an electric motor 24 and a pressure transducer 27 at an outlet of the fluid pump 22. The fluid pump 22 is a fixed displacement pump that is in engagement with or coupled to the electric motor 24, which in the illustrated embodiment is a permanent magnet synchronous motor.

In the depicted embodiment of FIG. 1, the fluid pump 22 is in fluid communication with the fluid reservoir 14 and the actuator 16. While fluid pump 22 is shown in direct fluid communication with the fluid reservoir 14 and the actuator 16, it will be understood that the scope of the present disclosure is not limited to the fluid pump 22 being in direct fluid communication with the fluid reservoir 14 and actuator 16 as any number of valves or other fluid components could be disposed between the fluid pump 22 and the fluid reservoir 14 and/or actuator 16.

In the depicted embodiment, the electric motor 24 is in electrical communication with the controller 20. As will be described in greater detail herein, the controller 20 outputs an electrical signal 25 to the electric motor 24. In response to the electrical signal 25, a shaft 26 of the electric motor 24 rotates. As the fluid pump 22 is a fixed displacement pump and as the fluid pump 22 is in engagement with the shaft 26 of the electric motor 24, the rotation of the shaft 26 causes the fluid pump 22 to transfer fluid from the fluid reservoir 14 to the actuator 16.

Figure 2:
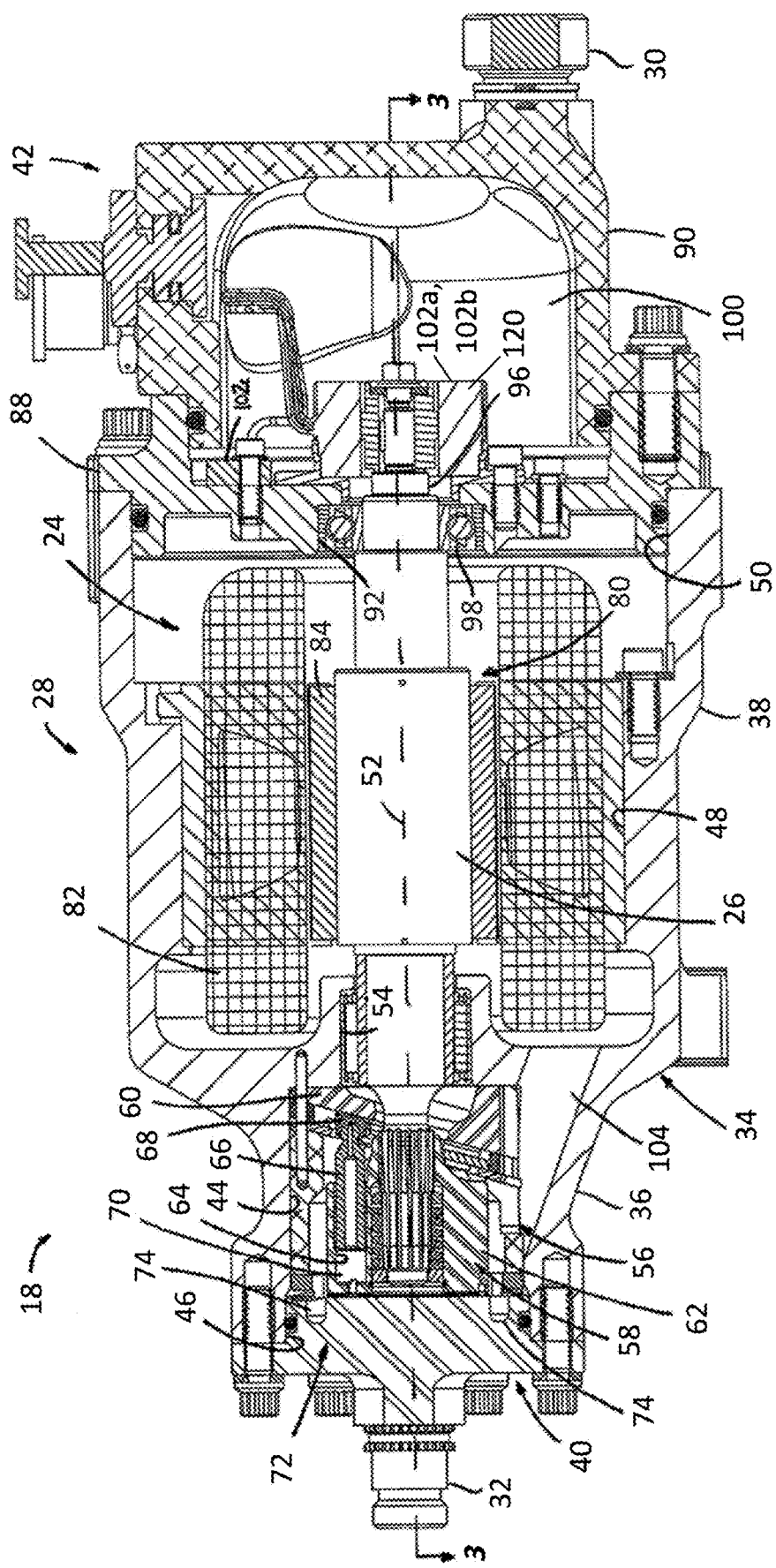
FIG. 2 is a cross-sectional view of an example of a rotary fluid device suitable for use with system of FIG. 1.

Referring to FIG. 2, an example configuration of a rotary fluid device 18 is shown; other suitable rotary fluid devices may also be utilized in the hydraulic system 10 and/or in conjunction with the controller 20. The exemplary rotary fluid device 18 includes a housing, generally designated 28. The housing 28 includes a fluid inlet 30 and a fluid outlet 32. The housing 28 further includes a main body, generally designated 34, which includes a first end portion 36 and an opposite second end portion 38, a first end assembly, generally designated 40, which is adapted for engagement with the first end portion 36 of the main body 34, and a second end assembly, generally designated 42, which is adapted for engagement with the second end portion 38.

The first end portion 36 of the main body 34 defines a first chamber 44 having a first opening 46 while the second end portion 38 defines a second chamber 48 having a second opening 50. In the depicted embodiment, the first and second openings 46, 50 are oppositely disposed along a longitudinal axis 52 of the main body 34. A chamber 54 through the main body 34 connects the first chamber 44 to the second chamber 48.

In the depicted embodiment, the first chamber 44 is adapted to receive the fluid pump 22 through the first opening 46 while the second chamber 48 is adapted to receive the electric motor 24 through the second opening 50. The shaft 26 of the electric motor 24 extends through the chamber 54 and is engaged with the fluid pump 22.

A pumping assembly, generally designated 56, is disposed in the first chamber 44 of the main body 34. While the pumping assembly 56 is shown as an axial piston assembly, it will be understood that the pump assembly 56 is not so necessarily limited as the pumping assembly 56 could be a vane assembly, gerotor assembly, cam lobe assembly, etc. In the depicted embodiment, the pumping assembly 56 includes a barrel assembly 58 and an angle block 60.

The barrel assembly 58 includes a cylinder barrel 62 defining an inner bore. In the depicted embodiment, the inner bore of the cylinder barrel 62 includes a plurality of internal teeth that are adapted for engagement with the shaft 26.

The cylinder barrel 62 further defines a plurality of axially oriented cylinder bores 64. Disposed within each cylinder bore 64 is an axially reciprocal piston 66, which includes a generally spherical head that is pivotally received by a slipper member 68. The slipper members 68 slide along an inclined surface of the stationary angle block 60.

The cylinder bores 64 and the pistons 66 cooperatively define a plurality of volume chambers 70. In response to rotation of the shaft 26, the cylinder barrel 62 rotates about a rotating axis causing the plurality of volume chambers 70 to expand and contract. In the depicted embodiment, the rotating axis is generally aligned with the longitudinal axis 52. During rotation of the cylinder barrel 62, fluid from a fluid source (e.g., the fluid reservoir 14) is drawn into the expanding volume chambers 70 while fluid from the contracting volume chambers 70 is expelled to a fluid destination (e.g., the actuator 16).

The first end assembly 40 is engaged with the first end portion 36 of the main body 134. The first end assembly 40 includes a valving portion 72 having an inlet passage 74 and an outlet passage 76 (shown in FIG. 3). In the depicted embodiment, the inlet and outlet passages 74, 76 are arcuately shaped fluid passages. The inlet and outlet passages 74, 76 are adapted for commutating fluid communication with the volume chambers 70 of the barrel assembly 58. The expanding volume chambers 70 are in fluid communication with the inlet passage 74 while the contracting volume chambers 70 are in fluid communication with the outlet passage 76. The inlet passage 74 is in fluid communication with the fluid inlet 30 while the outlet passage 76 is in fluid communication with the fluid outlet 32. In the depicted embodiment, the fluid outlet 32 is defined by the first end assembly 40.

The electric motor 24 is disposed in the second chamber 48 of the main body 34. The electric motor 24 is a three-phase permanent magnet synchronous motor. It will be understood, however, that the scope of the present disclosure is not limited to the electric motor 24 being a three-phase permanent magnet synchronous motor. The electric motor 24 includes a rotor 80 and a stator 82.

The rotor 80 includes permanent magnets 84 engaged with the shaft 26. In one embodiment, the permanent magnets 84 are keyed to the shaft 26 so that the permanent magnets 84 rotate with the shaft 26.

The stator 82 is engaged with the second end portion 38 of the main body 34. The stator 82 includes a plurality of coils that create an electromagnetic field when current passes through the coils. By energizing the coils of the stator 82, the permanent magnets 84 rotate causing the shaft 26 to rotate as well.

The second end assembly 42 is engaged with the second end portion 38 of the main body 34. In the depicted embodiment, the second end assembly 42 includes a plate assembly 88 and a cover assembly 90.

The plate assembly 88 is engaged with the second opening 50 of the second end portion 38 of the main body 34. The plate assembly 88 defines a central chamber 92 and a plurality of flow passages 94 (shown in FIG. 3). The central chamber 92 is adapted to receive an end portion 96 of the shaft 26. In the depicted embodiment, a conventional bearing assembly 98 is engaged in the central chamber 92 such that an inner race of the bearing assembly 98 is in tight-fit engagement with the shaft 26 while an outer race of the bearing assembly 98 is in tight-fit engagement with the central chamber 92.

The cover assembly 90 defines the fluid inlet 30 for the rotary fluid device 18. In the depicted embodiment, the cover assembly 90 and the plate assembly cooperatively define a third chamber 100 of the rotary fluid device 18.

One or more sensors 102 can be disposed in the third chamber 100. The one or more sensors 102 can include a speed sensor 102a, a position sensor 102b, and/or a fluid temperature sensor 102c. In the depicted embodiment, a conventional resolver is used for the speed sensor 102a and the position sensor 102b. The resolver includes a stator portion and a rotor portion. The stator portion includes a plurality of wire windings through which current flows. As the rotor portion rotates, the relative magnitudes of voltages through the wire windings are measured and used to determine speed and position of the rotor portion. In the depicted embodiment, the rotor portion is disposed on the end portion 96 of the shaft 26.

The fluid temperature sensor 102c can be used to measure the temperature of the fluid in the rotary fluid device 18. In the depicted embodiment, the fluid temperature sensor 102c is engaged with the plate assembly 88 and disposed adjacent to one of the plurality of flow passages 94. The fluid temperature sensor 102c can be a conventional resistance temperature detector (RTD). The RTD includes a resistor that changes resistance value as its temperature changes.

Figure 3:
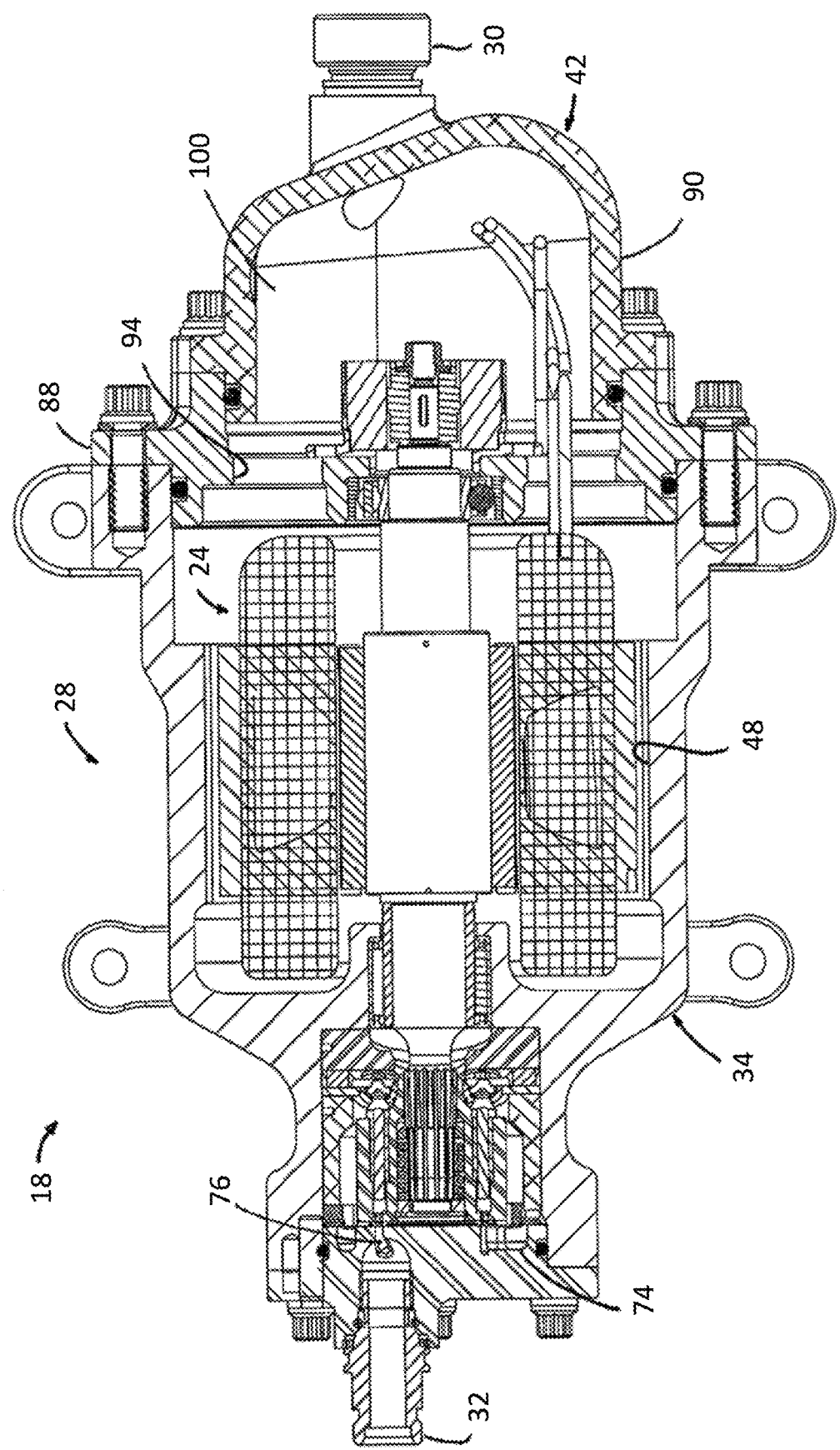
FIG. 3 is a cross-sectional view of the rotary fluid device taken on line 3-3 of FIG. 2.

Referring now to FIGS. 2 and 3, the flow of fluid through the rotary fluid device 18 will be described. As the shaft 26 of the electric motor 24 rotates, fluid enters the fluid inlet 30 of the second end assembly 42. The fluid enters the third chamber 100 and passes through the flow passages 94 in the plate assembly 88. The fluid then enters the second chamber 48 of the main body 34. In the second chamber 48, the fluid is in contact with the electric motor 24. This fluid contact is potentially advantageous as it provides lubrication to the electric motor 24.

The fluid passes from the second chamber 48 to the first chamber 44 through a fluid pathway 104. The fluid pathway 104 is in fluid communication with the inlet passage 74. The fluid then enters the expanding volume chamber 70. As the barrel assembly 58 rotates about the rotating axis, the pistons 66 axially extend and retract from the cylinder bores 64. As the pistons 66 extend, the volume chambers 70 expand thereby drawing fluid from the inlet passage 74 into the expanding volume chambers. As the pistons 66 contract, the volume chambers 70 contract thereby expelling fluid from the contracting volume chambers 70 through the outlet passage 76 and through the fluid outlet 32.

Figure 4:
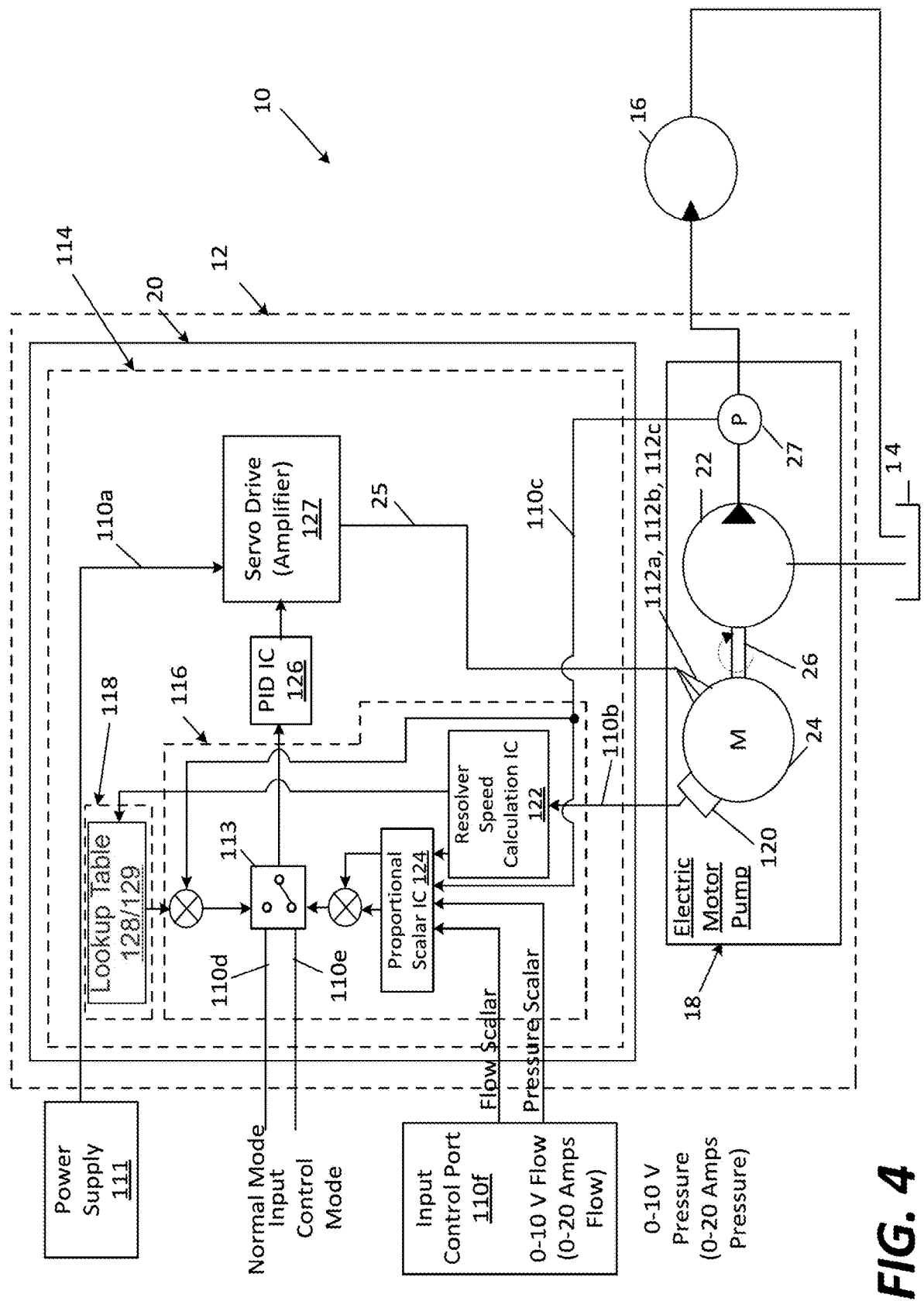
FIG. 4 is a schematic representation of a controller suitable for use with the system of FIG. 1.

Referring now to FIG. 4, the schematic representation of the simplified exemplary hydraulic system 10 is illustrated once again including a schematic representation of the controller 20. The controller 20 supplies an electrical signal 25 to the electric motor 24 in order to obtain a desired characteristic (e.g., constant horsepower, pressure compensation, variable pressure compensation, etc.) from the rotary fluid device 18. The controller 20 uses one or more control algorithms and/or predefined performance data for the electric motor 24 and the fluid pump 22 to control or regulate the rotary fluid device 18. Through the use of the one or more control algorithms and/or the predefined performance data, the rotary fluid device 18 can be controlled to have constant horsepower characteristics, pressure compensation characteristics, and/or variable pressure compensation characteristics.

In the depicted embodiment, the controller 20 converts a direct current voltage input to an alternating phase current output, which is supplied to the electric motor 24 for driving the pumping assembly 56. The controller 20 includes a plurality of inputs 110. In the depicted embodiment, and by way of example only, the plurality of inputs 110 include a voltage input 110a provided by the power supply 111, a shaft position input 110b provided by a resolver 120 operating as both the speed sensor 102a and position sensor 102b (see FIG. 2), a pump output pressure input 110c provided by the pressure transducer 27, a normal mode input 110d provided by an electronic switch 113, a control mode input 110e provided by the electronic switch 113, and an input control port 110f that provides a voltage or current input to the controller 20.

The controller 20 further includes a plurality of outputs 112 including a voltage output 112a, a phase current output 112b and a phase angle output 112c. In the depicted embodiment, each of the plurality of outputs 112 is in electrical communication with the electric motor 24.

The controller 20 further includes a circuit 114 having a microprocessor 116, a resolver speed calculation Integrated Circuit (IC) 122, a proportional scalar IC 124, a Proportional-Integral-Derivative (PID) IC 126, and a servo drive 127.

In the depicted embodiment, the microprocessor 116 is a field programmable gate array (FPGA). The FPGA 116 is a semiconductor device having programmable logic components, such as logic gates (e.g., AND, OR, NOT, XOR, etc.) or more complex combinational functions (e.g., decoders, mathematical functions, etc.), and programmable interconnects, which allow the logic blocks to be interconnected. In the depicted embodiment, the FPGA 116 is programmed to provide voltage and current to the electric motor 24 of the rotary fluid device 18 such that the rotary fluid device 18 responds in accordance with desired performance characteristics (e.g., constant horsepower, pressure compensation, constant speed, variable pressure compensation, etc.). Storage media, which can be independent of or incorporated into the microprocessor 116, the resolver speed calculation Integrated Circuit (IC) 122, the proportional scalar IC 124, the Proportional-Integral-Derivative (PID) IC 126, and/or the servo drive 127, can be non-transitory volatile memory (e.g., RAM), non-transitory non-volatile memory (e.g., ROM, flash memory, etc.), or a combination of the two and includes program code for the FPGA 116 as well as a look-up table 128 and a second lookup table 129.

The first lookup table 128 includes performance data for the rotary fluid device 18. In one embodiment, and by way of example only, the lookup table 128 includes a relationship between the speed of the shaft 26 of the electric motor 24, the output pressure of the fluid pump 22 and an output flow of the fluid pump 22. As the lookup table 128 provides performance characteristics of the rotary fluid device 18, the lookup table 128 accounts for performance losses in the pumping assembly 56 and the electric motor 24. These performance losses include but are not limited to leakage. In certain embodiments, the lookup table 128 can further provide a relationship between phase current supplied to the electric motor 24 and the speed of the shaft 26 and/or a relationship between the phase angle between voltage and current supplied to the electric motor 24 and the torque output of the electric motor 24. The lookup table 128 can also include temperature variables to account for changes in the relationship between phase current and shaft speed and phase angle and torque due to fluctuations in fluid temperature.

The resolver speed calculation IC 122 calculates the speed of the electric motor 24. The calculated speed can then be used by the controller 20 to identify a setpoint output pressure of the fluid pump 22 from the lookup table 128 or to identify a setpoint flow of the fluid pump 22 from the lookup table The proportional scalar IC 124 is used during input control mode to proportionally scale the peak performance values of pressure and/or flow in the lookup table 129 (all other values in the lookup table 129 correspond to those of lookup table 128). The proportional scalar is only applied to the peak performance values such that if the input command scalar is a 50% command it will result in 50% of full performance (whether it is pressure or flow). In certain embodiments, predetermined peak performances values of pressure and/or flow are stored in a separate memory allocation rather than the lookup table 129. In this embodiment, the scalar at the input control port 110ƒ, is used to provide an instruction to the controller 20 to access a certain predetermined peak performance value stored in memory using lookup table 128 and apply the scalar to the predetermined peak performance values. Whether using lookup table 129 or predetermined peak performance values in combination with lookup table 128, a flow scalar (e.g., 0-10 volts or 0-20 amps) can be provided at the input control port 110ƒ and/or a pressure scalar (e.g., 0-10 volts or 0-20 amps) can be provided at the input control port 110ƒ during control mode operation to obtain operation at a desired percentage (e.g. 0-100%) peak performance.

The PID IC 126 compares the setpoint output pressure obtained from the lookup table 128, 129 to the pressure feedback provided by the pressure transducer 27 and operates to minimize the difference (e.g., error) between the two pressures resulting in an output command signal to the servo drive 127 causing a change in operation of the rotary fluid device 18 to more closely achieve the setpoint output pressure (e.g., the speed of the motor 24 is adjusted, which indirectly adjusts flow due to the pump 22 being a fixed displacement pump, to arrive at the lookup table 128, 129 pressure value. In certain embodiments, the PID IC 126 is programmed with maximum and minimum command signal limits to ensure the rotary fluid device 18 operates within a desired a range.

The servo-drive 127 receives the command signal from the PID IC 126, amplifies the signal and transmits electric current to the electric motor 24 in order to produce motion proportional to the command signal to achieve the desired setpoint output pressure.

Referring now to FIGS. 1 and 4, the operation of the fluid device system 12 in both a normal mode of operation and an input control mode of operation will be described. Voltage is supplied to the circuit 114 of the controller 20 from the power supply 111 (e.g., battery, generator, etc.). With the circuit 114 in a powered state, the FPGA 116 receives sensed operating parameters through the plurality of inputs 110. The FPGA 116 uses the 116 uses these sensed operating parameters and the lookup table 128 to determine parameters (e.g., voltage, phase current, phase angle, etc.) of the electrical signal 25 that correlate to the desired attribute (e.g., constant horsepower, constant torque, constant speed, pressure compensation, variable pressure compensation, etc.) of the rotary fluid device 18. The servo drive 127 of the controller 20 outputs the electrical signal 25 having the determined parameters to the electric motor 24.

Figure 5:
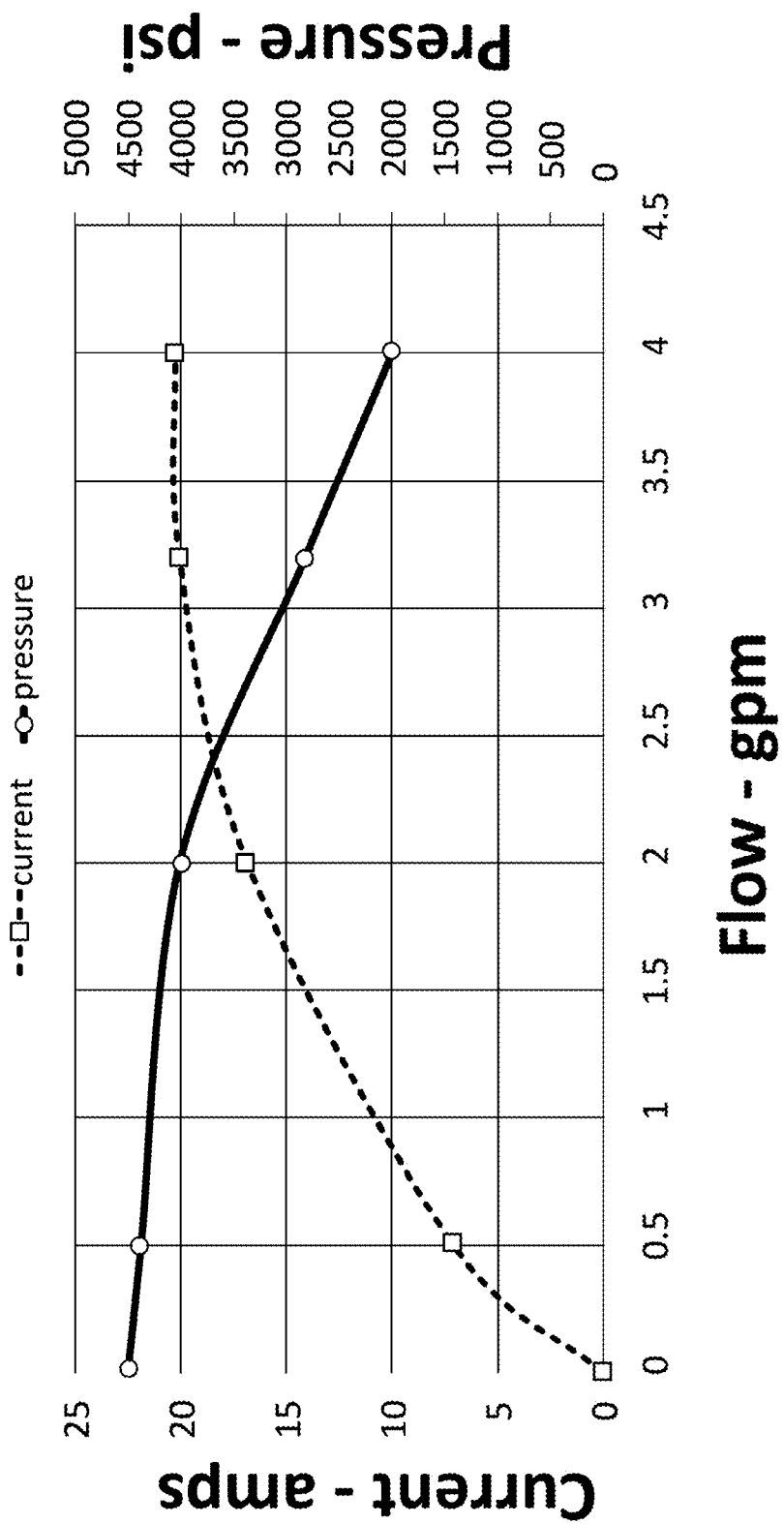
FIG. 5 is a pump curve of electronic pressure compensated hydraulic motor pump whose performance is 100% of rated output power.

In a normal mode of operation, the normal mode input 110d is set at the electronic switch 113 while a voltage or a current (alternatively, an absence of a voltage or an absence of a current) provided at the input control port 110ƒ instructs the controller 20 that the performance of the rotary fluid device 18 is to be 100% of the rated output power, which can be constant pressure control or constant horsepower control per factory settings. FIG. 5 illustrates a pump curve of an electric motor pump whose performance is 100% of rated output power.

By way of example, a generally constant horsepower can be obtained from the pumping assembly 56 by the controller 20 controlling the voltage and current supplied to the electric motor 24 in response to information provided in the lookup table 128. For example, the horsepower (i.e., $HP_{motor-in}$) supplied to the electric motor from the controller 20 can be computed by multiplying the voltage from the controller 20 times the current from the controller 20. The horsepower out (i.e., $HP_{motor-out}$) of the electric motor 24 can be computed by multiplying the horsepower (i.e., $HP_{motor-in}$) supplied to the electric motor 24 times the efficiency of the electric motor 24. In the depicted embodiment, the horsepower out (i.e., $HP_{motor-out}$) of the electric motor 24 is generally equal to the horsepower (i.e., $HP_{pump-in}$) supplied to the pumping assembly 56. The horsepower out (i.e., $HP_{pump-out}$) of the pumping assembly 56 can be computed by multiplying the horsepower (i.e., $HP_{pump-in}$) supplied to the pumping assembly 56 times the efficiency of the pumping assembly 56. Therefore, the horsepower (i.e., $HP_{out}$) out of the rotary fluid device 18 is equal to the voltage supplied by the controller 20 times the current supplied by the controller 20 times the efficiency of the rotary fluid device 18 (i.e., efficiency of the electric motor 24 times the efficiency of the pumping assembly 56). In one embodiment, the controller 20 receives the efficiency of the rotary fluid device 18 from the lookup table 128 in response to information from at least one of the plurality of inputs 110 of the controller 20. In another embodiment, the controller computes the efficiency of the rotary fluid device 18 from the information provided by the lookup table 128 based on information from at least one of the plurality of inputs 110 of the controller 20. Based on this efficiency, the controller 20 can modify, adjust or regulate the voltage, current and phase angle accordingly to maintain a generally constant horsepower from the rotary fluid device 18.

Figure 6:
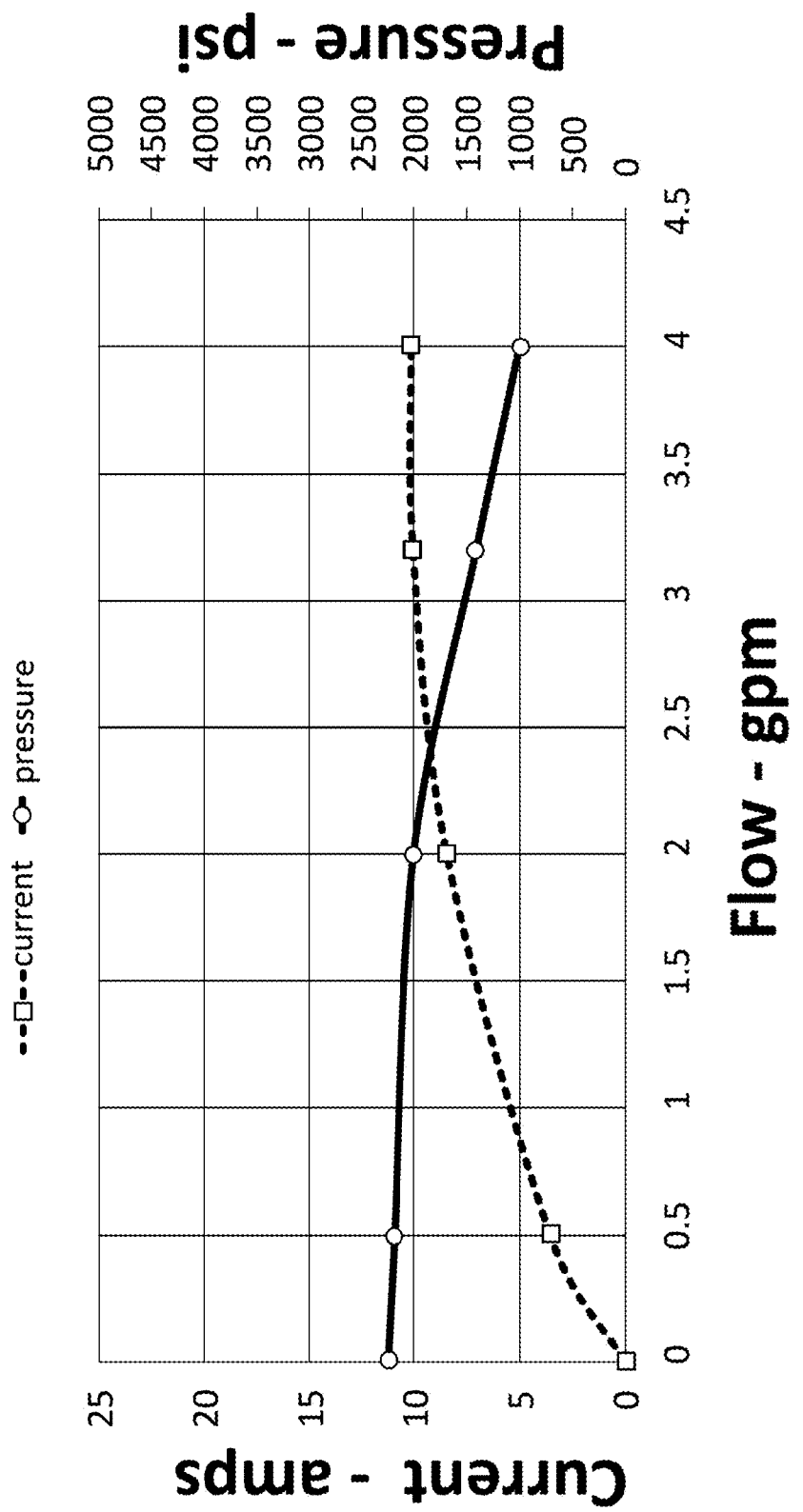
FIG. 6 is a pump curve of an electronic pressure compensated hydraulic motor pump whose performance is 50% of rated output power.

In an input control mode of operation, the input control mode input 110e is set at the electronic switch 113 while a desired voltage (e.g., 0-10 volts) or a desired current (0-20 amps) provided at the input control port 110*f* as a flow scalar or a pressure scalar. While in the input control mode, an input at the input control port 110*f* instructs the controller 20 that the input scalar value should be used to proportionally scale the rated power of the rotary fluid device 18 effectively changing the output pressure or the flow rate of the rotary fluid device 18. FIG. 6 illustrates an example of a pump curve of an electric motor pump whose performance is 50% of rated output power.

As such, during input control mode operation, the flow and/or pressure scalar is applied to the lookup table peak performance values or to fixed predetermined values stored in memory representing rated performance. The respective value is multiplied by the scalar to determine the new set point value for speed (which is indirectly a new set point value for flow since the pump 22 is a fixed displacement pump) and the pressure sensor 27 signal is also scaled by being multiplied by the scalar to establish a new set point value that is used as the feedback error to adjust the speed.

In an example of input control mode operation, a signal provided at the input control port 110*f* can have a full scale of 0 to 10 volts to independently control flow (e.g., speed of the electric motor 24) or pressure (torque of the electric motor 24). With a 10 volt signal as the flow scalar at the input control port 110*f* the rated speed of the electric motor 24 will be capable of achieving 100% of flow rate depending on an outlet pressure control setting. With a 5 volt signal as the pressure scalar at the input control port 110*f* the motor torque of the electric motor 24 will be 50% of rated performance which will produce 50% of the rated pump pressure. With these two settings, the rotary fluid device 18 produces the max rated flow the rotary fluid device 18 was designed for and the output pressure will be 50% reduced from the rated pressure. Utilization of one or both of the flow scalar and the pressure scalar ultimately results in less power consumed by the rotary fluid device 18 allowing a machine or vehicle to effectively manage the power available under changing load conditions. This feature of utilizing flow and/or pressure scalars is especially beneficial for managing available power in electrical systems that switch between different operational modes to, e.g., a generator mode where power is consumption is of a lesser concern and a battery mode where power consumption is of a greater concern. Electrical systems that switch between different operational modes are commonly found in the aerospace industry Additional uses of the rotary fluid device 18 operating in an input control mode of operation include actuator load and rate control. For actuators requiring rate control, a position feedback signal can be input to the controller 20 of the rotary fluid device 18. The positional feedback signal changes the electric motor speed (slower to faster) which is directly connected to the hydraulic pump resulting in a closed loop rate control of the actuator enabling accurate speed/rate control of the actuator regardless of aiding or opposing load cases reacting on the actuator.

Regardless of the application, the rotary fluid device 18 operating in an input control mode enables capacity (e.g., fluid volume per unit time) adjustments of a fixed displacement pump, which is otherwise difficult to obtain. While in the input control mode, the controller 20 can also scale the pressure to help manage the overall power consumed.

In either the normal mode of operation or the input control mode of operation of the rotary fluid device 18, the controller 20, as opposed to a mechanical spring/spool arrangement, is used as a pressure compensator for the pumping assembly 56 by controlling the voltage and current supplied to the electric motor 24 in response to information provided in the lookup table 128, 129. The controller 20 can regulate the outlet pressure from the pumping assembly 56 by regulating the speed of the electric motor 24, which controls the flow output of the rotary fluid device 18.

Knowing the speed of the shaft 26 of the rotary fluid device 18 and the current supplied to the electric motor 24, the controller 20 can determine the torque output of the rotary fluid device 18 by using the lookup table 128. As torque is a function of pressure and displacement of the rotary fluid device 18 and as the displacement of the rotary fluid device 18 is fixed, the controller 20 can determine the pressure of the rotary fluid device 18 based on this torque determination.

In one embodiment, the controller 20 includes a predefined pressure and/or torque upper limit, which can be scaled according to the scalar when the rotary fluid device 18 is operating in an input control mode. If the controller 20 determines that the pressure or torque output of the rotary fluid device 18 is exceeding this limit, the controller 20 can reduce the pressure or torque by reducing the speed of the electric motor 24. As the speed of the electric motor 24 decreases, the pressure output from the rotary fluid device 18 also decreases. When the pressure or torque of the rotary fluid device 18 is below the limit, the controller 20 can regulate the speed of the electric motor 24 to maintain the pressure of the rotary fluid device 18.

In another embodiment, the controller 20 includes the predefined pressure and/or torque upper limit and a lower speed threshold. In this embodiment, if the speed of the electric motor 24 is decreased to the lower speed threshold and the pressure and/or torque of the rotary fluid device 18 has not decreased below the upper limit, the controller 20 stops supplying current to the electric motor 24. Once the pressure and/or torque of the rotary fluid device 18 falls below the upper limit, the controller 20 will supply current to the electric motor 24.

As it may be advantageous to control the rotary fluid device 18 as a constant horsepower, constant speed, or constant torque device in a certain applications and in other applications it may be advantageous to control the rotary fluid device 18 as a pressure compensated device. Changing the rotary fluid device 18 to a pressure compensated device can be changed achieved by changing the lookup table 128. Alternatively, multiple lookup tables 128 can be stored on the storage media and a user selects which lookup table 128 is used by the controller 20 based on the desired operation of the rotary fluid device 18. For example, the controller 20 may be in electrical communication with a multi-position switch. With the switch in a first position, a first lookup table 128 having performance characteristics for the rotary fluid device 18 in constant horsepower mode is used by the controller 20. With the switch in a second position, a second lookup table 128 having performance characteristics for the rotary fluid device 18 in pressure compensation mode is used by the controller 20. The switch can be manually or electronically operated.

Alternatively, the multiple lookup tables 128 can be selected based on a sensed parameter of the rotary fluid device 18. For example, the controller 20 can use the first lookup table 128 if the speed of the shaft 26 of the rotary fluid device 18 is above a certain threshold such as 8,000 rpm while the controller 20 can use a second lookup table 128 if the speed of the shaft 26 of the rotary fluid device 18 is below a certain threshold, such as 8,000 rpm. It will be understood, however, that a single lookup table 128 could incorporate the performance characteristics of the first and second lookup tables 128.

In yet another alternative, the lookup table 128, which includes the performance characteristics of the rotary fluid device 18, can be updated. For example, if the rotary fluid device 18 is replaced or if the rotary fluid device 18 is rebuilt, a new lookup table 128 having the performance characteristics of the replacement or rebuilt rotary fluid device 18 can be uploaded or stored on the storage media.

Further details regarding pressure compensation of a fixed displacement electric motor pump can be found in U.S. Pat. No. 10,100,827, which is hereby incorporated by reference.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fluid device system comprising:
   a) a fluid pump having a fluid inlet and a fluid outlet, the fluid pump having a fixed displacement;
   b) an electric motor having a shaft coupled to the fluid pump, the electric motor being adapted for rotation in response to a power command signal; and
   c) a controller including an output to communicate the power command signal to the electric motor and including a first input for receiving a first input value, the controller being adapted to adjust the power command signal to operate the electric motor in a normal operating mode and an input control operating mode:
      i) in the normal operating mode, the controller refers to a lookup table using the first input value and outputs a first power command signal to the electric motor; and
      ii) in the input control operating mode, the controller calculates a second power command signal based on a scalar value such that the fluid pump is operated at a reduced capacity in comparison to the normal operating mode, wherein the scalar value includes at least one of a pressure scalar value or a flow scalar value, wherein at least one of the flow scalar value or the pressure scalar value is multiplied by a value generated from the lookup table; and
   wherein the lookup table is a first lookup table and wherein one of the flow scalar value or the pressure scalar is stored in a second lookup table or in memory as a predetermined value.

2. The fluid device system of claim 1, wherein the controller includes a switch adapted to receive an external input for switching the fluid device system between the normal and input control operating modes.

3. The fluid device system of claim 1, wherein the controller includes a second input for receiving at least one of the flow scalar value or the pressure scalar.

4. The fluid device system of claim 3, wherein the second input is configured to receive a variable voltage input or variable current input.

5. The fluid device system of claim 1, wherein the first input value is an output signal from a pressure sensor and wherein the first power command signal is a pressure control signal.

6. The fluid device system of claim 1, wherein the first lookup table provides a correlation between a current supplied to the electric motor and a speed of the electric motor.

7. The fluid device system of claim 1, further comprising at least one sensor in electrical communication with the controller, wherein the at least one sensor is adapted to sense a rotational speed of the shaft of the electric motor and a position of the shaft.

8. The fluid device system of claim 1, wherein the scalar value includes both the flow scalar value and the pressure scalar value.

9. The fluid device system of claim 1, wherein the first lookup table is used only in the normal operating mode.

10. The fluid device system of claim 1, wherein the normal operating mode is a constant horsepower mode.

11. The fluid device system of claim 1, wherein one of the pressure scalar value or the flow scalar value is multiplied with a value based on a respective one of a maximum pressure or a maximum flow in the second lookup table.

12. The fluid device system of claim 1, wherein the input control operating mode includes a minimum power command signal and a maximum power command signal.

13. A fluid device system comprising:
   a) a fluid pump having a fluid inlet and a fluid outlet, the fluid pump having a fixed displacement;
   b) an electric motor having a shaft coupled to the fluid pump, the electric motor being adapted for rotation in response to a power command signal; and
   c) a controller including an output to communicate the power command signal to the electric motor and including a first input for receiving a first input value, the controller being adapted to adjust the power command signal to operate the electric motor in a normal operating mode and an input control operating mode:
      i) in the normal operating mode, the controller refers to a first lookup table using the first input value and outputs a first power command signal to the electric motor; and
      ii) in the input control operating mode, the controller calculates a second power command signal such that the fluid pump is operated at a reduced capacity in comparison to the normal operating mode; wherein a scalar value proportionally scales a rated power of the fluid pump, the scalar value includes at least one of a pressure scalar value or a flow scalar value, wherein at least one of the flow scalar value or the pressure scalar value is multiplied by a value generated from the first lookup table, and wherein the flow scalar value and/or the pressure scalar value is stored in a second lookup table or in memory as a predetermined value.

14. The fluid device system of claim 13, wherein the controller includes a switch adapted to receive an external input for switching the fluid device system between the normal and input control operating modes.

\* \* \* \* \*